United States Patent
Warren et al.

(10) Patent No.: US 12,250,899 B2
(45) Date of Patent: Mar. 18, 2025

(54) MULCH GATE CONTROL LEVER

(71) Applicant: DEERE & COMPANY, Moline, IL (US)

(72) Inventors: Christopher C. Warren, Beaver Dam, WI (US); William P. Johnson, Cary, NC (US)

(73) Assignee: Deere & Company, Moline, IL (US)

( * ) Notice: Subject to any disclaimer, the term of this patent is extended or adjusted under 35 U.S.C. 154(b) by 722 days.

(21) Appl. No.: 17/447,111

(22) Filed: Sep. 8, 2021

(65) Prior Publication Data
US 2023/0070072 A1  Mar. 9, 2023

(51) Int. Cl.
*A01D 34/00* (2006.01)
*A01D 42/00* (2006.01)
A01D 101/00 (2006.01)

(52) U.S. Cl.
CPC ......... *A01D 34/006* (2013.01); *A01D 34/005* (2013.01); *A01D 42/005* (2013.01); *A01D 2101/00* (2013.01)

(58) Field of Classification Search
CPC .. A01D 34/006; A01D 34/005; A01D 42/005; A01D 2101/00; A01D 34/66; A01D 34/667; A01D 90/12
See application file for complete search history.

(56) References Cited

U.S. PATENT DOCUMENTS

| | | | |
|---|---|---|---|
| 5,146,735 A * | 9/1992 | McDonner | A01D 34/6806 D15/18 |
| 5,488,821 A | 2/1996 | McCunn et al. | |
| 5,628,171 A | 5/1997 | Stewart et al. | |
| 6,609,358 B1 | 8/2003 | Schmidt et al. | |
| 7,204,073 B1 * | 4/2007 | Chenevert | A01D 34/005 56/320.2 |
| 7,367,174 B2 | 5/2008 | Grimwade | |
| 8,132,396 B2 * | 3/2012 | Minami | A01D 42/005 56/320.1 |
| 8,234,849 B2 * | 8/2012 | Shimozono | A01D 42/005 56/320.1 |
| 9,485,911 B2 | 11/2016 | Thorman et al. | |
| 9,699,963 B2 | 7/2017 | Ressler et al. | |
| 9,750,179 B2 | 9/2017 | Korthals et al. | |
| 11,503,762 B2 * | 11/2022 | Kaskawitz | A01D 34/68 |
| 11,516,965 B2 * | 12/2022 | Strasser | A01D 34/008 |

(Continued)

FOREIGN PATENT DOCUMENTS

| CA | 2431753 A1 * | 12/2003 | ........... A01D 42/005 |
|---|---|---|---|
| EP | 1504647 A1 | 2/2005 | |

(Continued)

OTHER PUBLICATIONS

Great Britain Search & Examination Report Patent Application No. 2213038.9, dated Mar. 2, 2023, in 07 pages.

*Primary Examiner* — Arpad Fabian-Kovacs

(57) ABSTRACT

A mulch gate control lever includes a handle that moves a mulch gate on a vertical pivot axis between a first mulching position and a second side discharge position. A torsion spring biases the handle to move into a first position slot at a first end of a slotted bracket to retain the mulch gate at the first mulching position, and into a second position slot at a second end of the slotted bracket to retain the mulch gate at the second side discharge position.

17 Claims, 5 Drawing Sheets

(56) References Cited

U.S. PATENT DOCUMENTS

| | | | |
|---|---|---|---|
| 2003/0182915 A1* | 10/2003 | Kobayashi | A01D 34/71 |
| | | | 56/202 |
| 2003/0182916 A1* | 10/2003 | Iida | A01D 42/005 |
| | | | 56/202 |
| 2003/0217540 A1* | 11/2003 | Osborne | A01D 42/005 |
| | | | 56/320.1 |
| 2005/0076629 A1* | 4/2005 | Iida | A01D 34/71 |
| | | | 56/320.2 |
| 2007/0084176 A1* | 4/2007 | Chenevert | A01D 42/005 |
| | | | 56/320.1 |
| 2009/0031690 A1 | 2/2009 | Kallevig et al. | |
| 2011/0239616 A1* | 10/2011 | Shimozono | A01D 42/005 |
| | | | 56/320.2 |
| 2014/0318099 A1* | 10/2014 | Thorman | A01D 42/005 |
| | | | 56/320.2 |
| 2016/0360693 A1* | 12/2016 | Ressler | A01D 75/006 |
| 2020/0170185 A1* | 6/2020 | Kaskawitz | A01D 34/71 |
| 2021/0084819 A1 | 3/2021 | Strasser et al. | |
| 2022/0061210 A1 | 3/2022 | Huss et al. | |

FOREIGN PATENT DOCUMENTS

| | | | | |
|---|---|---|---|---|
| EP | 1719403 A1 * | 11/2006 | | A01D 42/005 |
| EP | 1767084 A1 * | 3/2007 | | A01D 34/005 |
| EP | 2371203 A1 | 10/2011 | | |
| EP | 3329759 A2 * | 6/2018 | | A01D 34/005 |
| GB | 2541279 A1 | 2/2017 | | |
| JP | 5364630 B2 * | 12/2013 | | A01D 42/005 |

* cited by examiner

MULCH GATE CONTROL LEVER

FIELD OF THE INVENTION

This invention relates to mower decks and, more specifically, multi-blade mower decks that may be converted between side discharge and mulching positions.

BACKGROUND OF THE INVENTION

Multi-blade mower decks have been offered with hinged baffles or gates that may be pivoted between side discharge (open) and mulching (closed) positions. The hinged baffles or gates may be connected to a mulch gate control lever above the deck. Various mulch gate control levers have been used to pivot mulch gates and hold them in either the side discharge position or mulching position.

U.S. Pat. No. 6,609,358 assigned to Deere & Company includes a handle for shifting the hinged baffles or gates between the side discharge and mulching positions. A push button on the handle may engage and disengage a pin from detents in a bracket on the mower deck. U.S. Pat. No. 9,699,963, also assigned to Deere & Company, includes a detent plate on the mower deck that stops and holds a mulch gate control lever in the side discharge and mulching positions. U.S. Pat. No. 9,485,911, also assigned to Deere & Company, includes a mulch gate control lever with an over center tension spring. The tension spring biases the lever and mulch gates to either the side discharge or mulching positions. Other mechanisms shown in the patent are mounted on the outer edge or skirt of the deck. U.S. Pat. No. 9,750,179 assigned to Deere & Company relates to an electric linear actuator with a plunger or ram that actuates a mulch gate control lever to move hinged baffles or gates between side discharge and mulching positions. US Patent Application 2021/0084819 relates to an electrically actuated mulch control lever that may be installed with a mulch kit and compensates for over or under travel of the plunger.

There is a need for a low cost mulch gate control lever that is durable and can firmly hold mulch gates in the side discharge and mulching positions. Mechanisms with detents and tension springs can wear out and may no longer provide sufficient forces to firmly hold the mulch gates in these positions. There also is a need for a mulch gate control lever that may be easily installed with a mulch kit by an operator or dealer. Some mulch gate control levers, such as electric linear actuators or mechanisms mounted to the edge of the mower deck, may be too costly or complex for mulch kits, or may interfere with other components of the mower deck.

SUMMARY OF THE INVENTION

A mulch gate control lever includes a pivot bracket pivotably mounted on a vertical pivot axis on a top surface of a mower deck, a handle attached to the pivot bracket, and a mulch gate mounted under the mower deck and pivotable on the vertical pivot axis between a first mulching position and a second side discharge position. A slotted bracket is mounted to the top surface of the mower deck, and a torsion spring biases the handle to engage a slot at a first end of the slotted bracket to hold the mulch gate at the first mulching position, or a slot at the second end of the slotted bracket to hold the mulch gate at the second side discharge position.

DESCRIPTION OF THE PREFERRED EMBODIMENT

Figure 1:
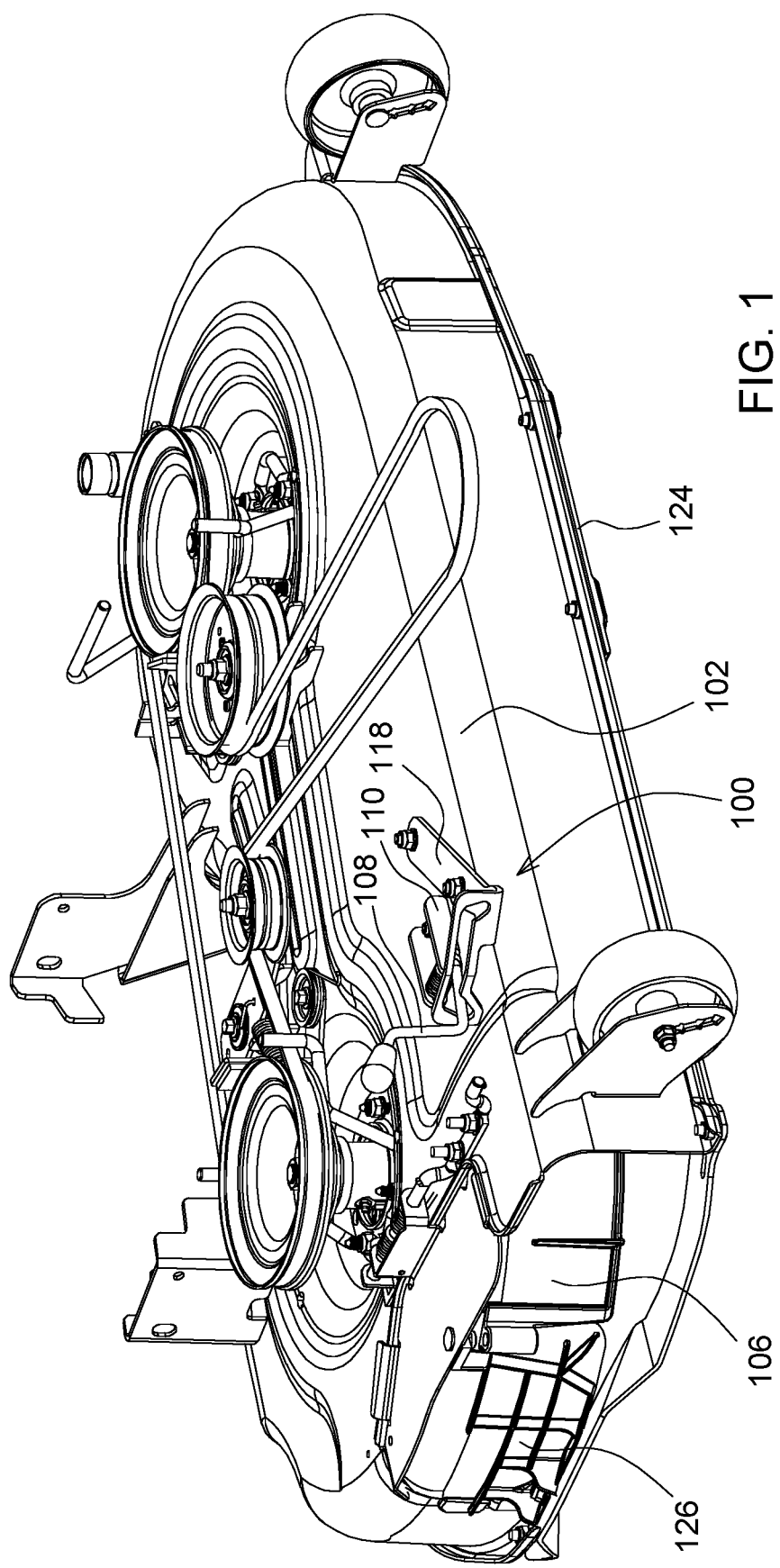
FIG. 1 is a top perspective view of a mower deck with a mulch gate control lever in the mulching position, according to a first embodiment of the invention.
Figure 2:
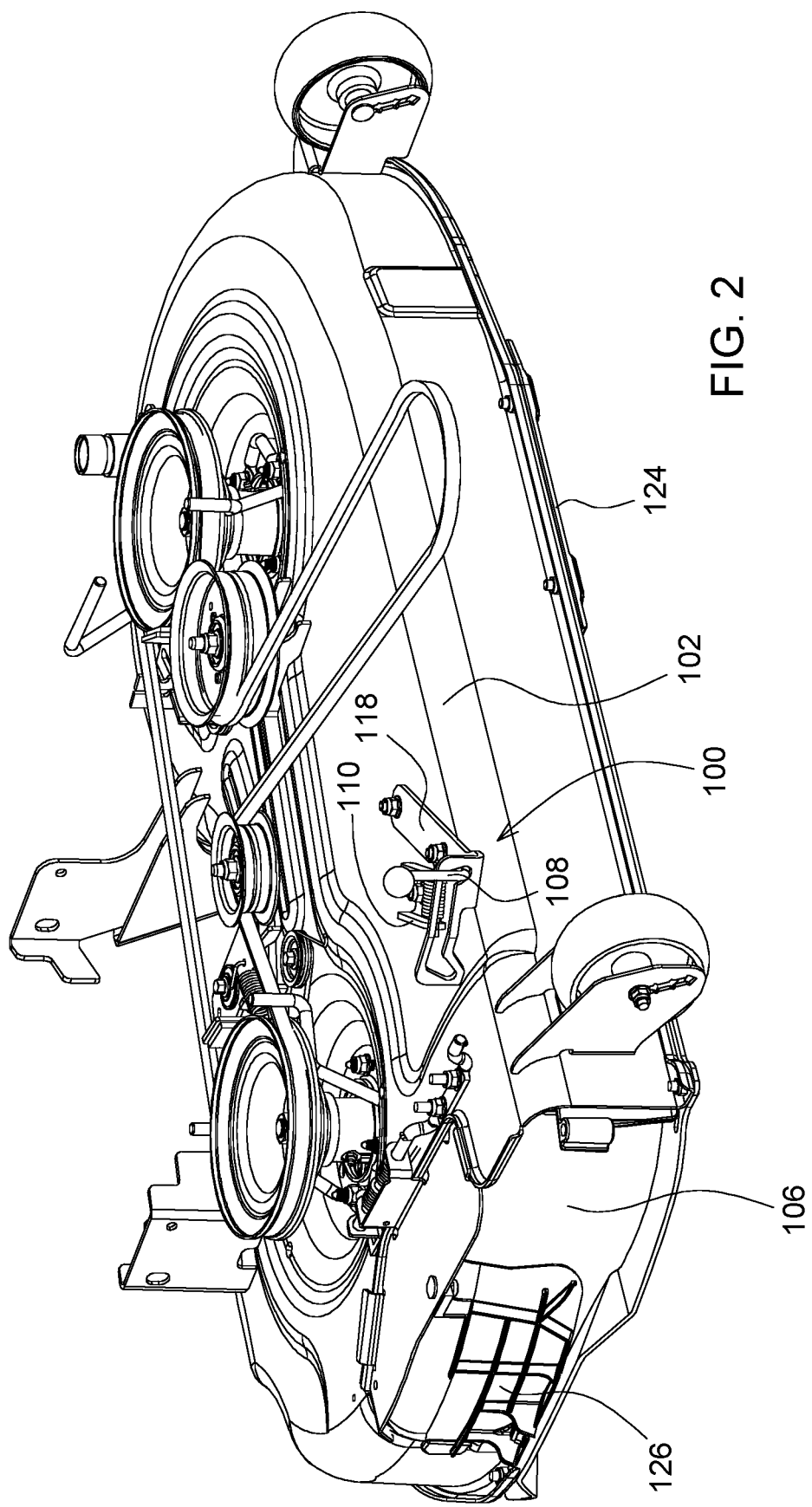
FIG. 2 is a top perspective view of a mower deck with a mulch gage control lever in a side discharge position, according to a first embodiment of the invention.

As shown in FIGS. 1 and 2, in one embodiment, mulch gate control lever 100 may be used to open and close one or more mulch gates under multi-blade mower deck 102. Each mulch gate may be pivotably mounted under the mower deck on a generally vertical pivot axis. For example, mulch gate 106 may be pivotably mounted on vertical pivot axis 104 adjacent the side discharge opening of the mower deck. Additional mulch gates also may be provided between the cutting chambers and may be connected by linkages under the mower deck allowing the mulch gates to pivot together. Stationary baffles also may be installed under the deck with the mulch kit to direct the flow of grass clippings. For example, front baffle 124 may direct the flow of clippings and help support pivot axis 104, and side baffle 126 may cover part of the mower deck's side discharge opening.

In one embodiment, mulch gate control lever 100 may be used to pivot mulch gate 106 between a first mulching (closed) position shown in FIG. 1, and a second side discharge (open) position shown in FIG. 2. The mulch gate control lever also may open and close additional mulch gates connected by linkages. The mulch gate control lever may include handle 108 pivotably mounted to pivot bracket 110. The pivot bracket may be a U-shaped structure mounted on the same vertical pivot axis 104 as mulch gate 106. For example, the pivot bracket may be attached to a rod or threaded fastener 120 extending through the top of the mower deck where it also may be attached to mulch gate 106. Handle 108 may pivot on horizontal axis 128 with respect to pivot bracket 110. For example, the handle may be a wire form having a first end extending through one or more openings in the pivot bracket and through torsion spring 112. The torsion spring may engage the pivot bracket and may bias the handle to pivot on horizontal axis 128 toward the first mulching (closed) position shown in FIG. 3 or the second side discharge (open) position shown in FIG. 4.

Figure 3:
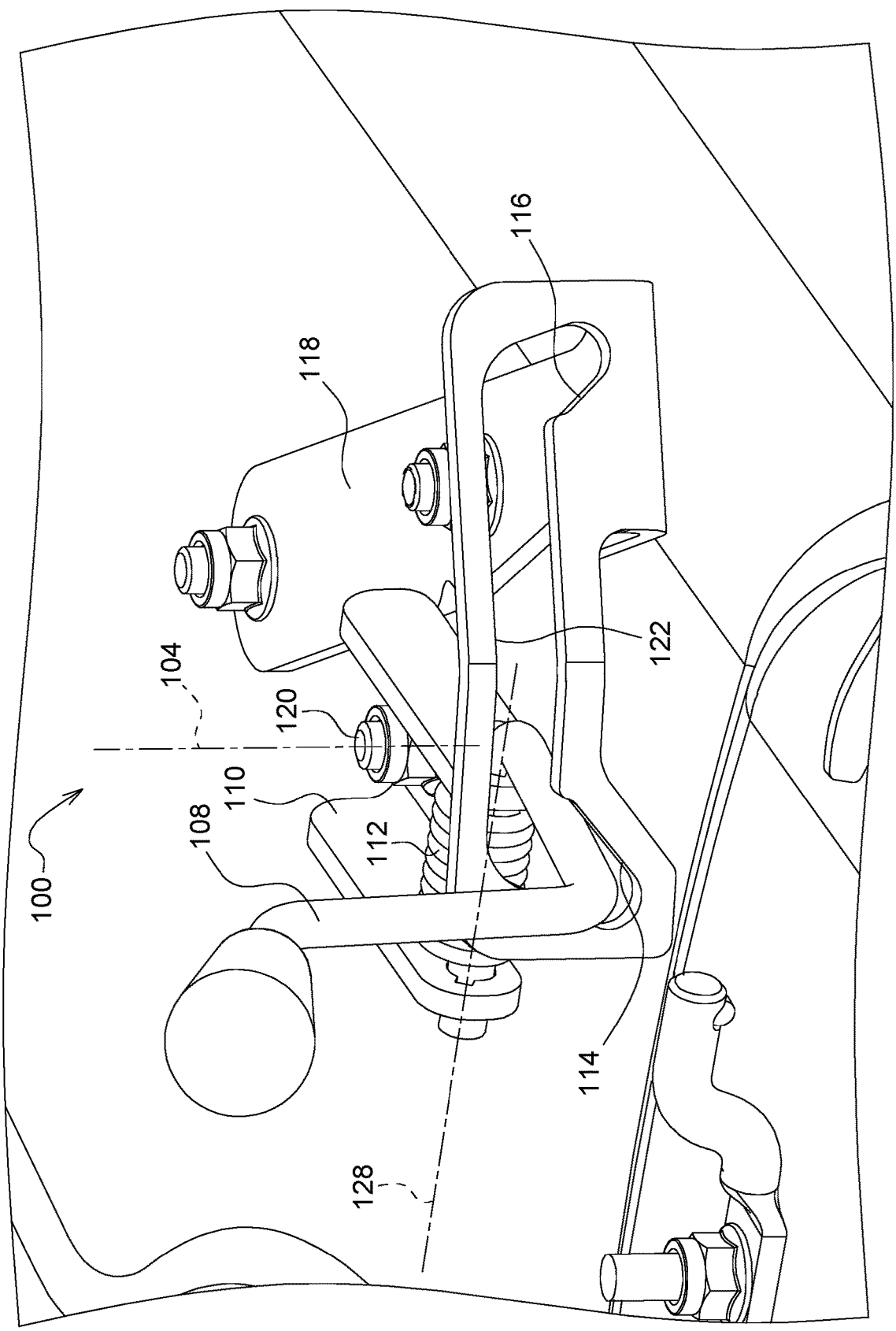
FIG. 3 is a top perspective view of a mulch gate control lever in the mulching position according to a first embodiment of the invention.
Figure 4:
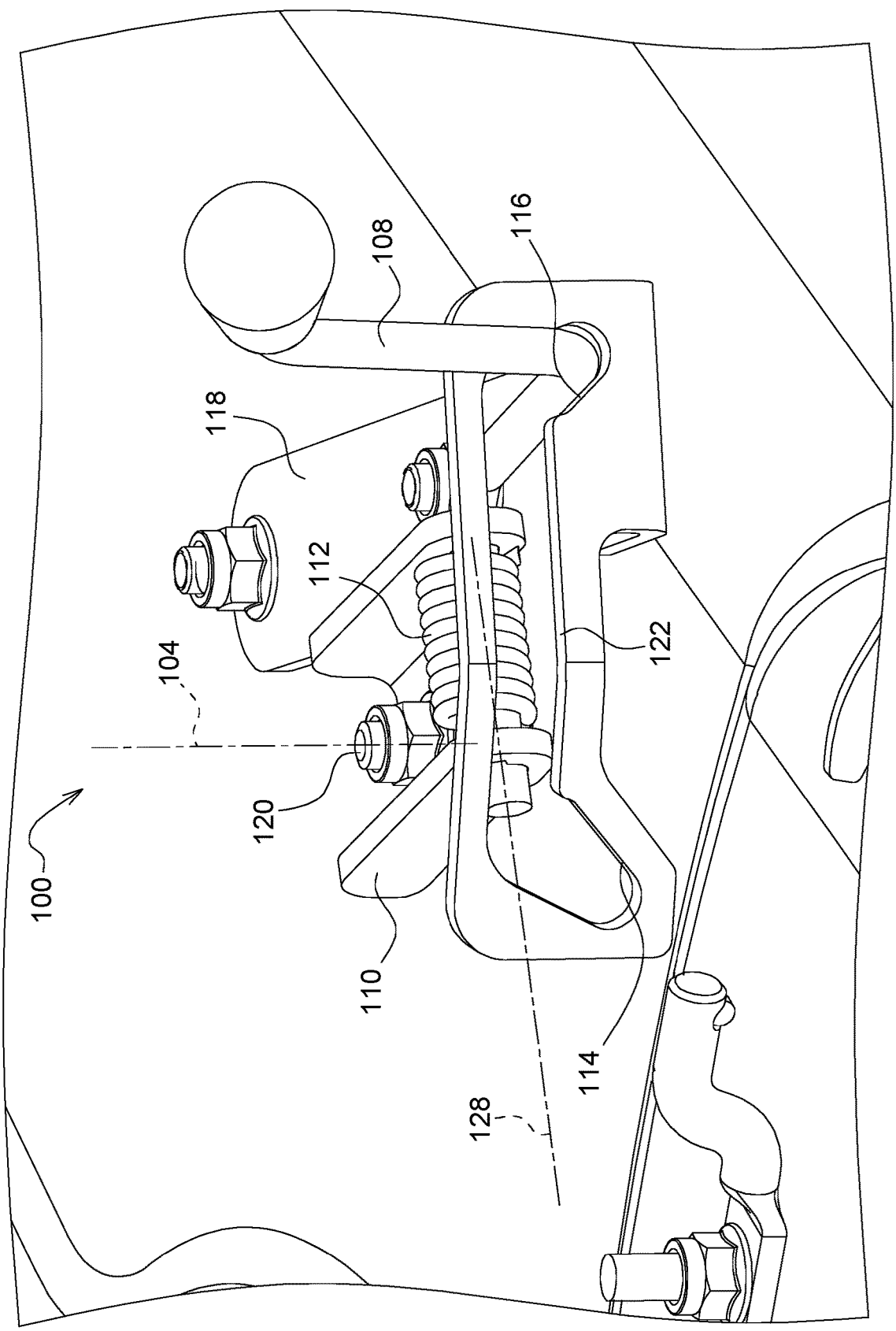
FIG. 4 is a top perspective view of a mulch gate control lever in the side discharge position according to a first embodiment of the invention.
Figure 5:
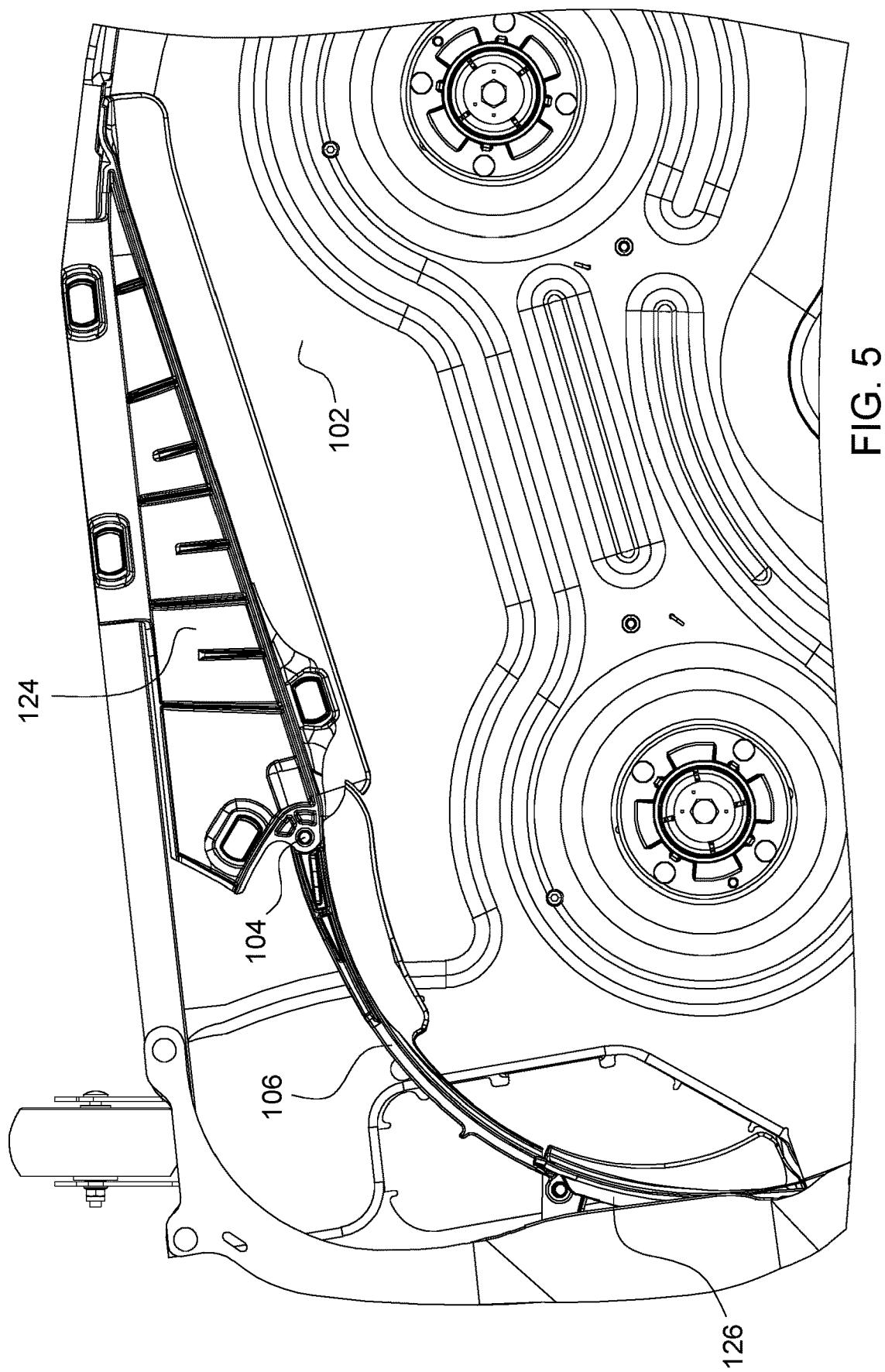
FIG. 5 is a bottom perspective view of a multi-bladed mower deck used with a mulch gate in a closed position according to a first embodiment of the invention.

In one embodiment shown in FIGS. 3 and 4, mulch gate control lever 100 may engage slotted bracket 118 mounted with fasteners to the top surface of the mower deck. Handle 108 may be inserted through horizontal slot 122 in slotted bracket 118. As handle 108 slides along horizontal slot 122, mulch gate 106 may pivot between the first mulching (closed) and second side discharge (open) positions. When handle 108 reaches the first end of horizontal travel slot 122, mulch gate 106 is in the first mulching (closed) position, and when handle 108 reaches the second end, the mulch gate is in the second side discharge (open) position. Position slots 114, 116 may be at each end of the horizontal travel slot. Torsion spring 112 may urge the handle down into first mulching (closed) position slot 114 at the first end, or second side discharge (open) position slot 116 at the second end. The torsion spring may provide force to firmly hold the handle in each position slot 114, 116. The side walls of each position slot may be angled or sloped to help keep the handle and mulch gate firmly in the first mulching (closed) position or second side discharge (open) as the mechanism wears over time. Additionally, the mulch gate control lever may include other intermediate position slots for holding firmly holding the mulch gate partially open.

Having described the preferred embodiment, it will become apparent that various modifications can be made without departing from the scope of the invention as defined in the accompanying claims.

The invention claimed is:

1. A mulch gate control lever, comprising:
   a rod or threaded fastener extending through a mower deck and defining a vertical pivot axis;
   a pivot bracket pivotably mounted on the vertical pivot axis on a top surface of the mower deck;
   a handle attached to the pivot bracket;
   a mulch gate mounted under the mower deck and pivotable on the vertical pivot axis between a first mulching position and a second side discharge position;
   a slotted bracket mounted to the top surface of the mower deck;
   a spring biasing the handle to engage a first end of the slotted bracket to hold the mulch gate at the first mulching position, or a second end of the slotted bracket to hold the mulch gate at the second side discharge position;
   wherein the slotted bracket defines a first position slot at the first end of the slotted bracket, a second position slot at the second end of the slotted bracket, and a substantially straight horizontal slot connecting the first position slot to the second position slot;
   wherein a first position slot direction is defined centrally along a length of the first position slot extending away from the substantially straight horizontal slot and defined to intersect a central distal end of the first position slot, wherein a second position slot direction is defined centrally along a length the second position slot extending away from the substantially straight horizontal slot and defined to intersect a central distal end of the second position slot; and
   wherein the first position slot direction and the second position slot direction are each transverse to vertical.

2. The mulch gate control lever of claim 1 wherein each of the position slots has a sloped side wall.

3. The mulch gate control lever of claim 1 wherein the spring is a torsion spring connecting between the pivot bracket and the handle.

4. The mulch gate control lever of claim 1 wherein the handle pivots on a horizontal axis relative to the pivot bracket.

5. The mulch gate control lever of claim 1 wherein each of the first and second position slots forms an obtuse angle with respect to the substantially straight horizontal slot.

6. The mulch gate control lever of claim 1 wherein the first position slot direction is transverse to the second position slot direction.

7. The mulch gate control lever of claim 1 wherein the central distal end is centered on the distal end.

8. A mulch gate control lever, comprising:
   a handle pivotably mounted on a horizontal pivot axis to a pivoting bracket and movable within a substantially straight horizontal slot;
   a rod or threaded fastener defining a vertical axis;
   the pivoting bracket and a mulch gate pivoting on the vertical axis between a first mulching position and a second side discharge position;
   a spring urging the handle to pivot on the horizontal axis into engagement with a position slot at each of the first mulching position and the second side discharge position;
   wherein each of the position slots defines a position axis centrally within the position slot, the position axis intersecting a central distal end of the position slot; and
   wherein the position axis of each of the position slots is transverse to vertical.

9. The mulch gate control lever of claim 8 wherein the spring is a torsion spring connected between the handle and the pivoting bracket.

10. The mulch gate control lever of claim 8 wherein each of the position slots is in a slotted bracket on the mower deck.

11. The mulch gate control lever of claim 10 wherein each of the position slots has a sloped side wall.

12. The mulch gate control lever of claim 8 wherein each of the position slots forms an obtuse angle with respect to a substantially straight horizontal slot connecting the position slots.

13. The mulch gate control lever of claim 8 wherein the position axis of one of the position slots is transverse to the position axis of the other of the position slots.

14. A mulch gate control lever, comprising:
   a handle that moves a mulch gate on a vertical pivot axis between a first mulching position and a second side discharge position; and
   a torsion spring that biases the handle to move into a first position slot at a first end of a substantially straight horizontal slot of a slotted bracket to retain the mulch gate at the first mulching position, and into a second position slot at a second end of the substantially straight horizontal slot of the slotted bracket to retain the mulch gate at the second side discharge position;
   wherein each of the position slots extends away from the substantially straight horizontal slot in a direction defined centrally within the respective position slot and intersecting a central distal end of the respective position slot, wherein each direction is transverse to vertical.

15. The mulch gate control lever of claim 14, wherein each of the slots has at least one sloped side wall.

16. The mulch gate control lever of claim 14 wherein each of the position slots forms an obtuse angle with respect to the substantially straight horizontal slot.

17. The mulch gate control lever of claim 14 wherein the direction of the first position slot is transverse to the direction of the second position slot.

\* \* \* \* \*